United States Patent
Webb

(10) Patent No.: US 11,028,713 B2
(45) Date of Patent: Jun. 8, 2021

(54) ROTATING CARBON PISTON RING SEAL

(71) Applicant: United Technologies Corporation, Farmington, CT (US)

(72) Inventor: Scot A. Webb, Gales Ferry, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 77 days.

(21) Appl. No.: 16/373,876

(22) Filed: Apr. 3, 2019

(65) Prior Publication Data
US 2020/0318489 A1    Oct. 8, 2020

(51) Int. Cl.
| F01D 11/00 | (2006.01) |
| F16J 15/34 | (2006.01) |
| F01D 11/02 | (2006.01) |
| F16J 15/16 | (2006.01) |

(52) U.S. Cl.
CPC ......... *F01D 11/005* (2013.01); *F16J 15/3464* (2013.01); *F01D 11/025* (2013.01); *F05D 2220/32* (2013.01); *F05D 2240/55* (2013.01); *F16J 15/164* (2013.01)

(58) Field of Classification Search
CPC ..... F01D 11/005; F01D 11/025; F16J 15/164; F16J 15/3464; F05D 220/32; F05D 2240/55; F05D 2240/58
See application file for complete search history.

(56) References Cited

U.S. PATENT DOCUMENTS

| 4,082,296 A | * | 4/1978 | Stein | F16J 15/3412 |
| | | | | 277/400 |
| 4,971,306 A | * | 11/1990 | Jinnouchi | F01D 11/003 |
| | | | | 277/544 |
| 8,939,710 B2 | * | 1/2015 | Webb | F16J 15/164 |
| | | | | 415/111 |
| 10,508,547 B2 | * | 12/2019 | Rawe | F04D 29/321 |

(Continued)

FOREIGN PATENT DOCUMENTS

| EP | 2453150 A1 | 5/2012 |
| EP | 2562364 A1 | 2/2013 |

(Continued)

OTHER PUBLICATIONS

European Search Report for European Application No. 20168032.9 dated Jul. 16, 2020.

*Primary Examiner* — Justin D Seabe
*Assistant Examiner* — Ryan C Clark
(74) *Attorney, Agent, or Firm* — Carlson, Gaskey & Olds, P.C.

(57) ABSTRACT

A gas turbine engine assembly includes a compressor including a plurality of rotors, where at least one of the plurality of rotors includes a radial inner sealing surface. A rotating shaft drives rotation of the plurality of rotors, where the rotating shaft includes an annular groove proximate the radial inner sealing surface. A seal is disposed within the annular groove, and the seal comprises at least two annular sections forming a complete circumference. Each of the at least two annular sections are separate parts and include a (Continued)

radially-facing sealing surface engaged to the radial inner sealing surface of the rotor and an annular slot disposed radially inward of the radially-facing sealing surface. A retainer is disposed within the annular slot limiting radial expansion of the at least two annular sections.

14 Claims, 3 Drawing Sheets

(56) References Cited

U.S. PATENT DOCUMENTS

| | | |
|---|---|---|
| 2004/0100035 A1 | 5/2004 | Turnquist et al. |
| 2004/0150164 A1 | 8/2004 | Morgan |
| 2013/0051993 A1 | 2/2013 | Webb |
| 2015/0050130 A1 | 2/2015 | Morreale et al. |
| 2016/0169389 A1* | 6/2016 | Haynes .................. F16J 15/26 |
| | | 277/544 |
| 2019/0323370 A1 | 10/2019 | Trivedi et al. |

FOREIGN PATENT DOCUMENTS

| | | |
|---|---|---|
| EP | 2803825 A1 | 11/2014 |
| EP | 3611348 A1 | 2/2020 |

* cited by examiner

ROTATING CARBON PISTON RING SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Seals are provided throughout the engine to control airflows. Some seals are disposed between relative rotating parts and are designed to accommodate wear. Other seals are disposed between parts that may rotate, but not relative to each other. Even without relative rotation, wear may occur due to vibrational, or other relative movement that occurs during engine operation.

Turbine engine manufacturers continually seek improvements to engine performance including improvements to thermal and propulsive efficiencies.

SUMMARY

A gas turbine engine assembly according to an exemplary embodiment of this disclosure includes, among other possible things, a compressor including a plurality of rotors, where at least one of the plurality of rotors includes a radial inner sealing surface. A rotating shaft drives rotation of the plurality of rotors, where the rotating shaft includes an annular groove proximate the radial inner sealing surface. A seal is disposed within the annular groove, and the seal comprises at least two annular sections forming a complete circumference. Each of the at least two annular sections are separate parts and include a radially-facing sealing surface engaged to the radial inner sealing surface and an annular slot disposed radially inward of the radial inner sealing surface. A retainer is disposed within the annular slot limiting radial expansion of the at least two annular sections.

In a further embodiment of the foregoing gas turbine engine assembly, the annular slot is disposed on a radially outer side of each of the at least two annular sections.

In a further embodiment of any of the foregoing gas turbine engines, the radially-facing sealing surface comprises a sealing surface on axial sides of the annular slot.

In a further embodiment of any of the foregoing gas turbine engines, an overlapping interface is between ends of the at least two annular sections.

In a further embodiment of any of the foregoing gas turbine engines, the at least two annular sections includes multiple annular sections that each include an overlapping interface between adjacent ends.

In a further embodiment of any of the foregoing gas turbine engines, the retainer comprises a spring that exerts a biasing force radially inward on the at least two annular sections.

In a further embodiment of any of the foregoing gas turbine engines, each of the at least two annular sections comprises a carbon material.

In a further embodiment of any of the foregoing gas turbine engines, the shaft includes a section of increased diameter with the annular groove positioned within the increased diameter.

In a further embodiment of any of the foregoing gas turbine engines, the radial inner surface includes an axially extending portion.

In a further embodiment of any of the foregoing gas turbine engines, the seal prevents hot airflow from moving forward past the seal.

A rotating seal assembly for sealing between co-rotating parts according to an exemplary embodiment of this disclosure includes, among other possible things, at least two annular sections forming a complete circumference, where each of the at least two annular sections are separate parts and include a radially-facing sealing surface and a slot disposed radially inward of the sealing surface. A retainer is disposed within the slot limiting radial expansion of the at least two annular sections.

In a further embodiment of the foregoing rotating seal assembly for sealing between co-rotating parts, the slot is disposed on a radially outer side of each of the at least two annular sections and the radially-facing sealing surface comprises a sealing surface on axial sides of the slot.

In a further embodiment of any of the foregoing rotating seal assemblies for sealing between co-rotating parts, an overlapping interface between ends of the at least two annular sections.

In a further embodiment of any of the foregoing rotating seal assemblies for sealing between co-rotating parts, the at least two annular sections includes multiple annular sections each including an overlapping interface between adjacent ends.

In a further embodiment of any of the foregoing rotating seal assemblies for sealing between co-rotating parts, the retainer comprises a spring that exerts a biasing force radially inward on the at least two annular sections.

In a further embodiment of any of the foregoing rotating seal assemblies for sealing between co-rotating parts, each of the at least two annular sections comprises a carbon material.

A method of assembling a rotating seal for a gas turbine engine according to an exemplary embodiment of this disclosure includes, among other possible things, positioning at least two annular seal sections within an annular groove formed in a shaft. The at least two annular seal sections are held within the annular groove with a retainer disposed within an annular slot within each of the at least two annular seal sections.

In a further embodiment of the foregoing method of assembling a rotating seal for a gas turbine engine, a radially inner sealing surface is assembled of a rotor radially outward of the annular groove and in sealing contact with the at least two annular sections.

In a further embodiment of any of the foregoing methods of assembling a rotating seal for a gas turbine engine, the shaft and the rotor rotate together such that there is no relative rotation there between and the seal expands radially outward against the radially inner sealing surface of the rotor in response to rotation.

In a further embodiment of any of the foregoing methods of assembling a rotating seal for a gas turbine engine, adjacent ends of each of the at least two annular sections overlap to maintain a complete annular seal with the seal in a radially expanded position.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
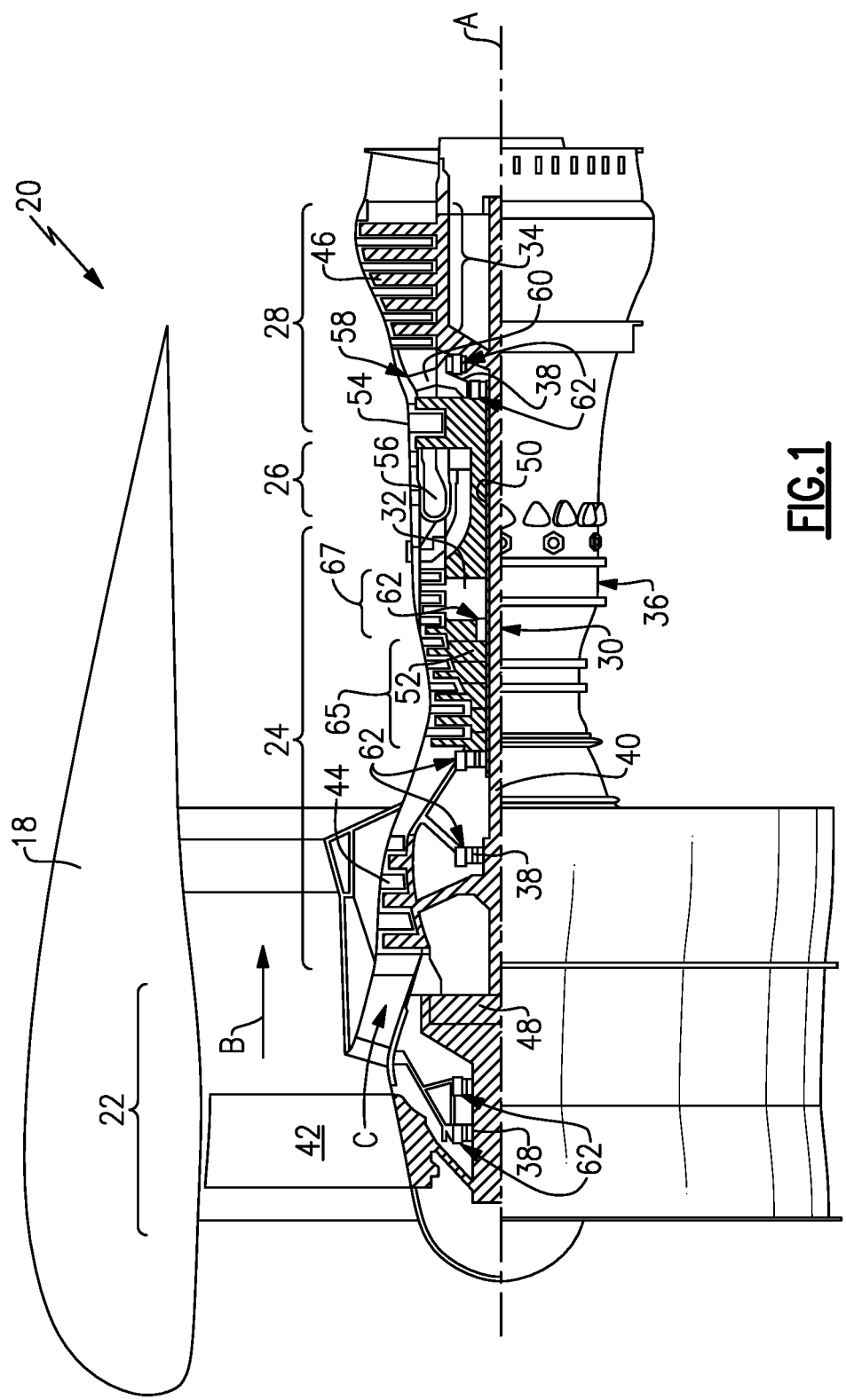
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

A seal assembly 62 is provided to contain airflow produced in aft compartments of the engine 20. The seal assembly 62 prevents hot airflow from accessing cooler parts of the engine 20. In one disclosed example embodiment, the seal assembly 62 is disposed within the high pressure compressor 52. In this example the high pressure compressor 52 is an eight stage compressor with forward stages 65 forward of the seal assembly 62 and aft stages 67 aft of the seal assembly 62. As appreciated, although the example seal is disclosed within an eight-stage high pressure compressor 52, other compressor configurations would benefit from this disclosure and are within the contemplated scope of this disclosure. Moreover, the example seal assembly 62 may be utilized in other locations of the engine 20 for containing and controlling airflow.

Additionally, although the example seal assembly 62 is disclosed by way of example with regard to use in a gas turbine engine, the example seal assembly may be used between any two co-rotating parts such as maybe contained in pumps, electric machines, compressors, steam turbines and other rotating structures. Accordingly, application of the seal assembly 62 in applications other than the disclosed gas turbine engine is within the contemplation and scope of this disclosure.

Figure 2:
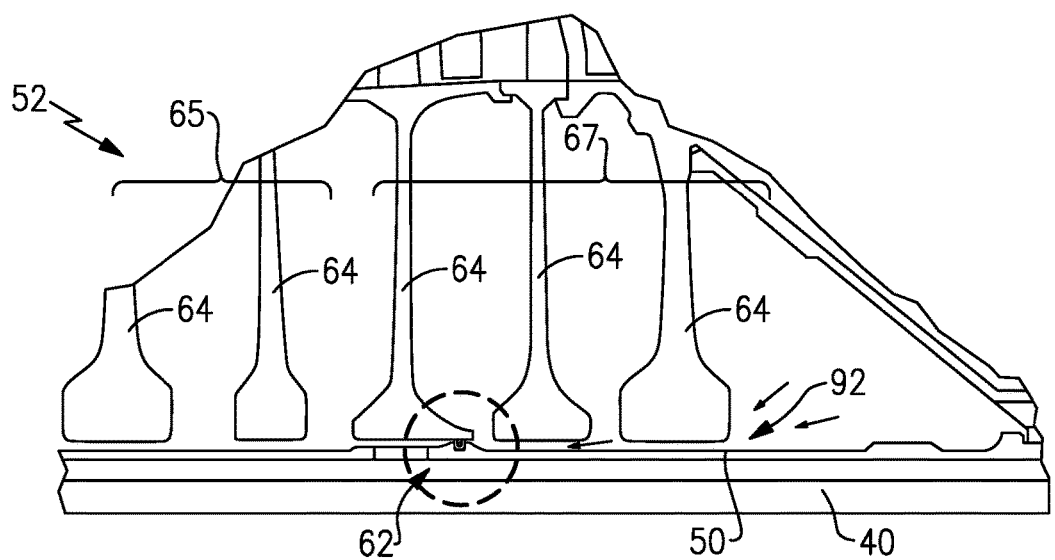
FIG. 2 is a schematic view of a portion of an example compressor section including an example seal assembly embodiment.

Referring to FIG. 2 with continued reference to FIG. 1, the example seal assembly 62 is disposed between the outer shaft 50 and a rotor 64. In the disclosed example, the rotors 64 are part of the high pressure compressor 52 and are driven by the outer shaft 50. The outer shaft 50 is concentric with the inner shaft and supported by bearing systems as shown in FIG. 1. Accordingly, the rotors 64 rotate at the same speed as the outer shaft 50. The seal assembly 62 prevents the flow of the hot air 92 from entering undesired stages of the high-pressure compressor 52. In this example, the seal assembly 62 prevents the flow from entering forward stages 65 of the high-pressure compressor 52 that are axially forward the seal assembly 62. The forward stages 65 are exposed to lower levels of thermal energy than aft stages 67. As can be appreciated, some portions of stage including the seal assembly 62 are heated because of the location of the seal assembly 62. Accordingly, the airflow schematically shown at 92 is contained aft of the seal assembly 62.

Figure 3:
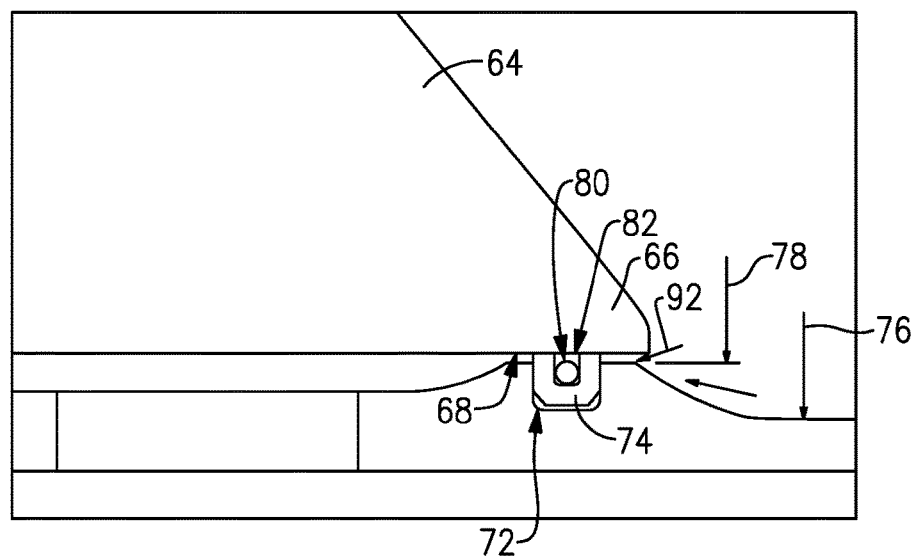
FIG. 3 is a cross-section of an example seal assembly embodiment.

Referring to FIG. 3 with continued reference to FIG. 2, the seal assembly 62 includes a seal 74 disposed within an annular groove 72 defined in the shaft 50. The shaft 50 includes a first diameter 76 and a second diameter 78. The second diameter 78 is larger than the first diameter 76 and includes the annular groove 72. The outer radial surface of the shaft 50 tapers outward radially from the first diameter 76 to the second diameter 78 on both a forward and aft sides of the annular groove 72.

The seal assembly 62 is annular and extends about the entire circumference of the shaft 50. The example seal 74 is approximately square in cross-section except for the annular slot 82. A retainer 80 is provide within the annular slot 82 to hold the seal 74 within the groove 72. The corners may be chamfered to reduce high stress concentration areas. Moreover, although the seal 74 is substantially square, other rectilinear shapes could be utilized and are within the contemplation and scope of this disclosure. The seal 74 includes an annular slot 82 that is continuous about the circumference of the seal 74. The seal 74 extends radially outward of the groove 72 into sealing contact with the inner sealing surface 68 of the rotor 64.

The example rotor 64 includes the radially inner sealing surface 68 that extends into an axially extending portion 66 that protrudes axially aft of a lower portion of the rotor 64. Although the sealing surface 68 is not connected to the shaft 50, the radially sealing surface 68, the portion 66 and outer shaft 50 rotate together. No relative rotation between the rotor 64, sealing surface 68, the portion 66 and outer shaft occurs. The seal assembly 62 rotates with the shaft 50 against the sealing surface 68 such that there is no relative rotation of the seal assembly 62.

Figure 4:
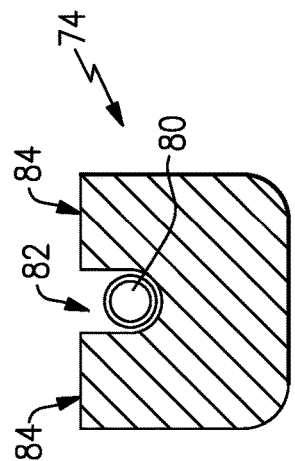
FIG. 4 is a cross-section of an example seal embodiment.
Figure 5:
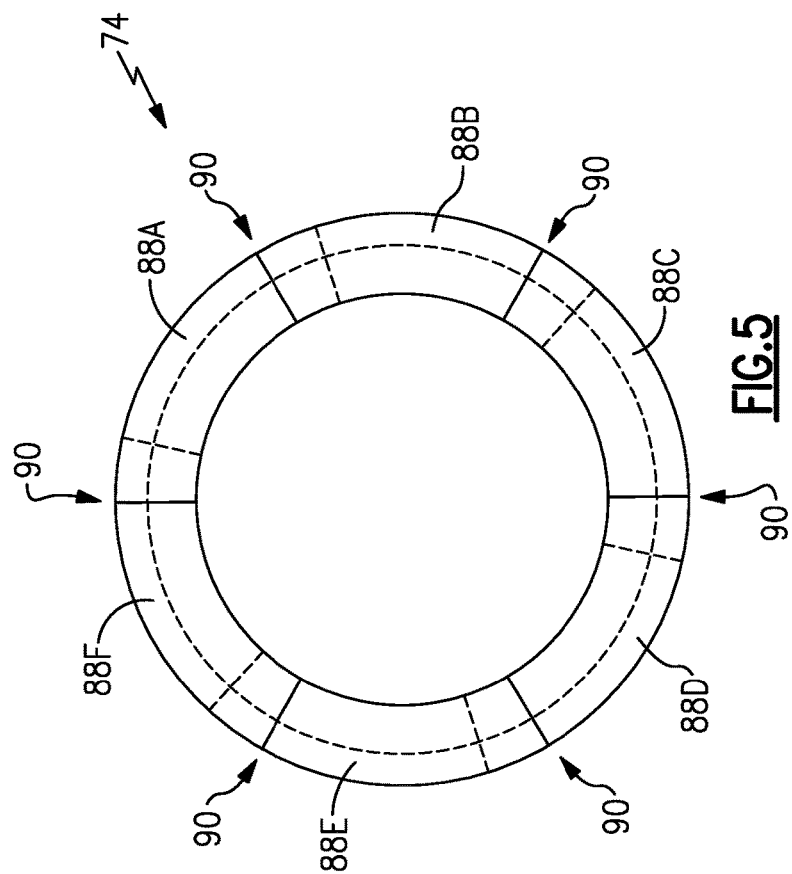
FIG. 5 is a front axial view of the example seal embodiment.

Referring to FIGS. 4 and 5 with continued reference to FIG. 3, the seal assembly 62 is formed of separate annular sections 88A-F. Each section 88A-F includes a radially outer sealing surface 84 (FIG. 4) that is separated by the annular slot 82. The sections 88A-F are mated at overlapping joints indicated at 90. In this example embodiment, the seal assembly 62 includes six annular sections 88A-F each separated and mated to an adjacent section at one of the joints 90. It should be appreciated that although six annular sections 88A-F are shown by way of example, more or less sections could be utilized and are within the scope and contemplation of this disclosure. The joints 90 are disposed to enable and accommodate circumferential expansion during engine operation. As the outer shaft 50 rotates, the annular sections 88A-F will be driven radially outward into sealing contact with the sealing surface 68 of the rotor 64. It should be appreciated that the seal 74 is in contact with the sealing surface 68 of the rotor 64 in an at rest condition and that rotation results in an increased force between sealing surfaces with only small amount of actual movement. The joints 90 extend radially and provide an overlap in an axial direction such that there is no open leak path in an axial direction.

The annular sections 88A-F are secured within the groove 72 by the retainer 80. The retainer 80 holds the annular sections 88A-F together within the groove during initial assembly and periods where the engine is not operating.

Figure 6:
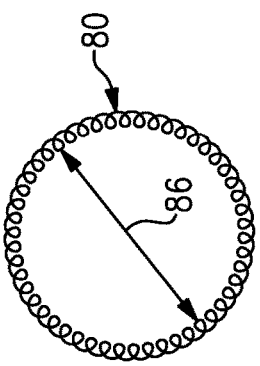
FIG. 6 is a schematic view of an example retainer embodiment.

Referring to FIG. 6 within continued reference to FIGS. 3-5, the example retainer 80 is a garter spring that provides a biasing force on the annular sections 88A-F radially inward. The retainer 80 could also be an elastomer material compatible with the temperature of the environment in which the seal 62 is provided. Moreover, other materials and structures other than disclosed garter spring may be utilized for the retainer and are within the scope and contemplation of this disclosure. The retainer 80 includes an expandable inner diameter 86 that is determined to enable assembly and also seating within the annular slot 82 of the seal 74. Moreover, the retainer 80 includes a diameter in cross-section that enables the retainer 80 to seat completely within the annular slot 82 such that that the retainer does not contact the sealing surface 68 of the rotor 64 during operation. The retainer 80 provides a biasing force sufficient to maintain the annular sections 88A-F together when not rotating while not restricting radial outward movement in response to rotation of the shaft 50.

Figure 7:
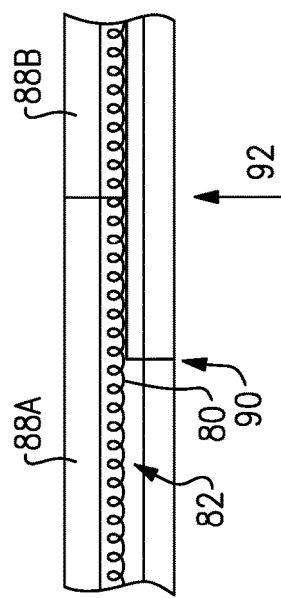
FIG. 7 is a radial view of an outer radial surface of the example seal in a collapsed position.

Referring to FIG. 7 with continued reference to FIGS. 3-6, one of the joints 90 is shown from a point looking radially outward at an inner surface that is transverse to the axis of rotation. Airflow 92 is prevented from moving past the seal 74 due to the radial sealing contact with the radial inner sealing surface 68. The airflow 92 is prevented from moving axially past the seal 74 due to the overlapped joint 90. In the collapsed condition shown in FIG. 7, the retainer 80 holds ends of the annular sections 88A and 88B together.

Figure 8:
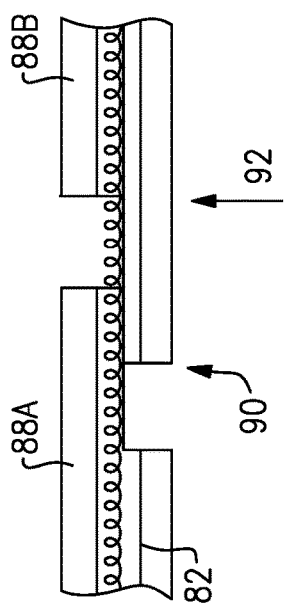
FIG. 8 is a radial view of the outer radial surface of the example seal in a radially expanded position.

Referring to FIG. 8, as the shaft 50 rotates, the annular sections 88A and 88B will spread apart in response to radial expansion. The radial spreading between annular sections 88A and 88B spreads ends of the annular sections 88A and 88B apart. The overlapping joint 90 maintains sealing contact to prevent leakage past the seal in the axial direction. It should be appreciated that the spreading of annular sections 88A and 88b are exaggerated to illustrate the disclosed features and may be much smaller in operation.

The segmented structure of the example seal 74 aids in initial assembly. During initial assembly, the annular sections 88A-D are placed within the annular groove 72. The retainer 80 is placed in the annular slot 82 and secured to itself to exert a biasing force that limits radial expansion during operation and holds the annular sections 88A-D in place until the radially facing sealing surface of the rotor 64 is placed over the seal 74. Assembly of the seal 74 includes assembly of each of the annular sections 88A-D in an overlapping shiplap joint to enable radial expansion during rotation. The radial expansion accommodates thermal expansion of the rotor 64 and shaft 50. The overlapped portions of each annular section 88A-D prevent axial leakage through the seal 74.

In one disclosed example embodiment, the seal 74 is formed from a carbon material. In other possible embodiments, the seal 74 may be formed from other materials including metals and non-metals that do not wear into either the shaft 50 or the rotor 64. In further disclosed embodiments, the seal 74 may be formed from ceramic, ceramic matrix composites or other polymer materials and composites that are compatible with the temperatures within the section of the compressor 52.

Accordingly, the example seal assembly 62 contains airflow while reducing and/or preventing wear on the shaft 50 and rotor 64.

Although an example embodiment has been disclosed, a worker of ordinary skill in this art would recognize that certain modifications would come within the scope of this disclosure. For that reason, the following claims should be studied to determine the scope and content of this disclosure.

What is claimed is:
1. A gas turbine engine assembly comprising:
   a compressor including a plurality of rotors, wherein at least one of the plurality of rotors includes a radial inner sealing surface;
   a rotating shaft driving rotation of the plurality of rotors, wherein the rotating shaft includes an annular groove proximate the radial inner sealing surface; and
   a seal disposed within the annular groove, the seal comprising at least two annular sections forming a complete circumference, wherein each of the at least two annular sections are separate parts and include a radially-facing sealing surface engaged to the radial inner sealing surface and an annular slot disposed radially inward of the radially-facing sealing surface; and a retainer dis- posed within the annular slot limiting radial expansion of the at least two annular sections.

2. The gas turbine engine assembly as recited in claim 1, wherein the annular slot is disposed on a radially outer side of each of the at least two annular sections.

3. The gas turbine engine assembly as recited in claim 2, wherein the radially-facing sealing surface comprises a sealing surface on axial sides of the annular slot.

4. The gas turbine engine assembly as recited in claim 1, including an overlapping interface between ends of the at least two annular sections.

5. The gas turbine engine assembly as recited in claim 4, wherein the at least two annular sections includes multiple annular sections each including an overlapping interface between adjacent ends.

6. The gas turbine engine assembly as recited in claim 1, wherein the retainer comprises a spring that exerts a biasing force radially inward on the at least two annular sections.

7. The gas turbine engine assembly as recited in claim 1, wherein each of the at least two annular sections comprises a carbon material.

8. The gas turbine engine assembly as recited in claim 1, wherein the shaft includes a section of increased diameter with the annular groove positioned within the increased diameter.

9. The gas turbine engine as recited in claim 8, wherein the radial inner surface includes an axially extending portion.

10. The gas turbine engine as recited in claim 1, wherein the seal prevents hot airflow from moving forward past the seal.

11. A method of assembling a rotating seal for a gas turbine engine comprising:

positioning at least two annular seal sections within an annular groove formed in a shaft; and holding the at least two annular seal sections within the annular groove with a retainer disposed within an annular slot of within each of the at least two annular seal sections.

12. The method as recited in claim 11, including assembling a radially inner sealing surface of a rotor radially outward of the annular groove and in sealing contact with the at least two annular sections.

13. The method as recited in claim 12, wherein the shaft and the rotor rotate together such that there is no relative rotation there between and the seal expands radially outward against the radially inner sealing surface of the rotor in response to rotation.

14. The method as recited in claim 13, including overlapping adjacent ends of each of the at least two annular sections to maintain a complete annular seal with the seal in a radially expanded position.

* * * * *